(12) United States Patent
Sawada et al.

(10) Patent No.: US 9,893,590 B2
(45) Date of Patent: Feb. 13, 2018

(54) INNER-ROTOR BRUSHLESS MOTOR

(71) Applicant: Nidec Corporation, Kyoto (JP)

(72) Inventors: Tomoyoshi Sawada, Kyoto (JP); Yuya Oura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 604 days.

(21) Appl. No.: 14/567,029

(22) Filed: Dec. 11, 2014

(65) Prior Publication Data

US 2015/0311769 A1    Oct. 29, 2015

(30) Foreign Application Priority Data

Apr. 28, 2014   (JP) .................. 2014-093230

(51) Int. Cl.
| | |
|---|---|
| *H02K 15/16* | (2006.01) |
| *H02K 7/04* | (2006.01) |
| *H02K 5/16* | (2006.01) |
| *H02K 29/08* | (2006.01) |
| *H02K 3/52* | (2006.01) |

(52) U.S. Cl.
CPC .............. *H02K 7/04* (2013.01); *H02K 3/522* (2013.01); *H02K 5/161* (2013.01); *H02K 29/08* (2013.01)

(58) Field of Classification Search
CPC .......... H02K 29/08; H02K 5/16; H02K 5/161; H02K 5/22; H02K 7/04; H02K 3/52; H02K 3/522; H02K 11/00; H02K 11/21; H02K 11/22; H02K 1/14; H02K 1/148; H02K 1/22; H02K 1/27; H02K 1/278; H02K 15/16; F04C 29/00; F04B 39/00
See application file for complete search history.

(56) References Cited

U.S. PATENT DOCUMENTS

| | | | | |
|---|---|---|---|---|
| 5,831,358 | A | * | 11/1998 | Bobay ..................... H02K 7/04 310/216.117 |
| 5,895,994 | A | * | 4/1999 | Molnar .................. H02K 1/165 310/194 |
| 8,378,540 | B2 | | 2/2013 | Furukawa et al. |
| 2014/0062226 | A1 | * | 3/2014 | Cho ....................... H02K 29/08 310/43 |

FOREIGN PATENT DOCUMENTS

| | | |
|---|---|---|
| CN | 202405980 U | 8/2012 |
| JP | 2005-102370 A | 4/2005 |
| JP | 2010-110049 A | 5/2010 |
| JP | 2010-206884 A | 9/2010 |
| JP | 2010-246390 A | 10/2010 |
| JP | 2012-029460 A | 2/2012 |

* cited by examiner

*Primary Examiner* — Tran Nguyen
(74) *Attorney, Agent, or Firm* — Keating & Bennett, LLP

(57) ABSTRACT

A rotor portion includes an upper cylindrical portion and a lower cylindrical portion, each of which is configured to rotate together with a rotor. A stator portion includes a circuit board including a rotation detection portion located thereon. The lower cylindrical portion includes a lower balance correction portion. The upper cylindrical portion includes an upper balance correction portion. In addition, a detectable portion configured to be detected by the rotation detection portion is provided on the upper cylindrical portion.

15 Claims, 9 Drawing Sheets

INNER-ROTOR BRUSHLESS MOTOR

BACKGROUND OF THE INVENTION

1. Field of the Invention

The present invention relates to an inner-rotor motor.

2. Description of the Related Art

In recent years, there has been a demand for high rotational accuracy of inner-rotor motors.

In addition, in recent years, with an increase in the number of electronic devices used in homes and workplaces, there has been a demand for reducing noise caused by various electronic devices, such as, for example, household electrical appliances and cooking appliances. Various techniques have been devised to reduce noise of motors, such as, for example, using inner-rotor motors and increasing rotational accuracy of the motors as greatly as possible.

In a known motor, a circuit board on which a Hall IC is provided is arranged inside a motor case, and the rotational position of a rotor defined by a permanent magnet is detected to realize high rotational accuracy. Such a known motor is described, for example, in JP-A 2005-102370.

However, in the case where there is a demand for a still higher degree of rotational accuracy, only detecting the rotational position of the rotor may be insufficient. In this case, a method of correcting dynamic balance of a rotor portion of the motor may be adopted, for example. However, in the case of the known motor disclosed in JP-A 2005-102370, a self-cooling fan arranged to cool electronic components and windings is arranged on one side of the rotor, and this makes it difficult to correct the dynamic balance.

SUMMARY OF THE INVENTION

An inner-rotor brushless motor according to a preferred embodiment of the present invention includes a rotor portion including a shaft extending in a vertical direction along a central axis; a stator portion located radially outside of the rotor portion; and a bearing portion configured to support the rotor portion with respect to the stator portion. The rotor portion includes a rotor configured to rotate together with the shaft, and including at least one magnet; and an upper cylindrical portion and a lower cylindrical portion located axially above and below, respectively, the rotor, and configured to rotate together with the rotor. The stator portion includes a stator located radially opposite to the rotor with a gap intervening therebetween; a housing configured to hold the stator; a cap located axially above the housing; and a circuit board held by one of the housing and the stator, and including a rotation detection portion arranged thereon. The bearing portion includes an upper bearing configured to rotatably support the shaft and held by the cap axially above the stator; and a lower bearing configured to rotatably support the shaft and held by the housing axially below the stator. The lower cylindrical portion includes a lower balance correction portion. The upper cylindrical portion includes a detectable portion configured to be detected by the rotation detection portion located thereon, and includes an upper balance correction portion.

According to the above preferred embodiment of the present invention, it is possible to detect the circumferential position of the rotor with high precision. In addition, it is possible to correct a dynamic balance of the rotor with the upper and lower balance correction portions arranged on both axial sides of the rotor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a central axis of a motor is referred to by the term "axial direction", "axial", or "axially", that directions perpendicular or substantially perpendicular to the central axis of the motor are referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a cap is located with respect to a rotor is defined as an upper side. The shape of each member or portion and relative positions of different members or portions will be described based on the above assumptions. It should be noted, however, that the above definitions of the vertical direction and the upper and lower sides are made simply for the sake of convenience in description, and should not be construed to restrict in any way the orientation of a motor according to any preferred embodiment of the present invention when in use.

Figure 1:
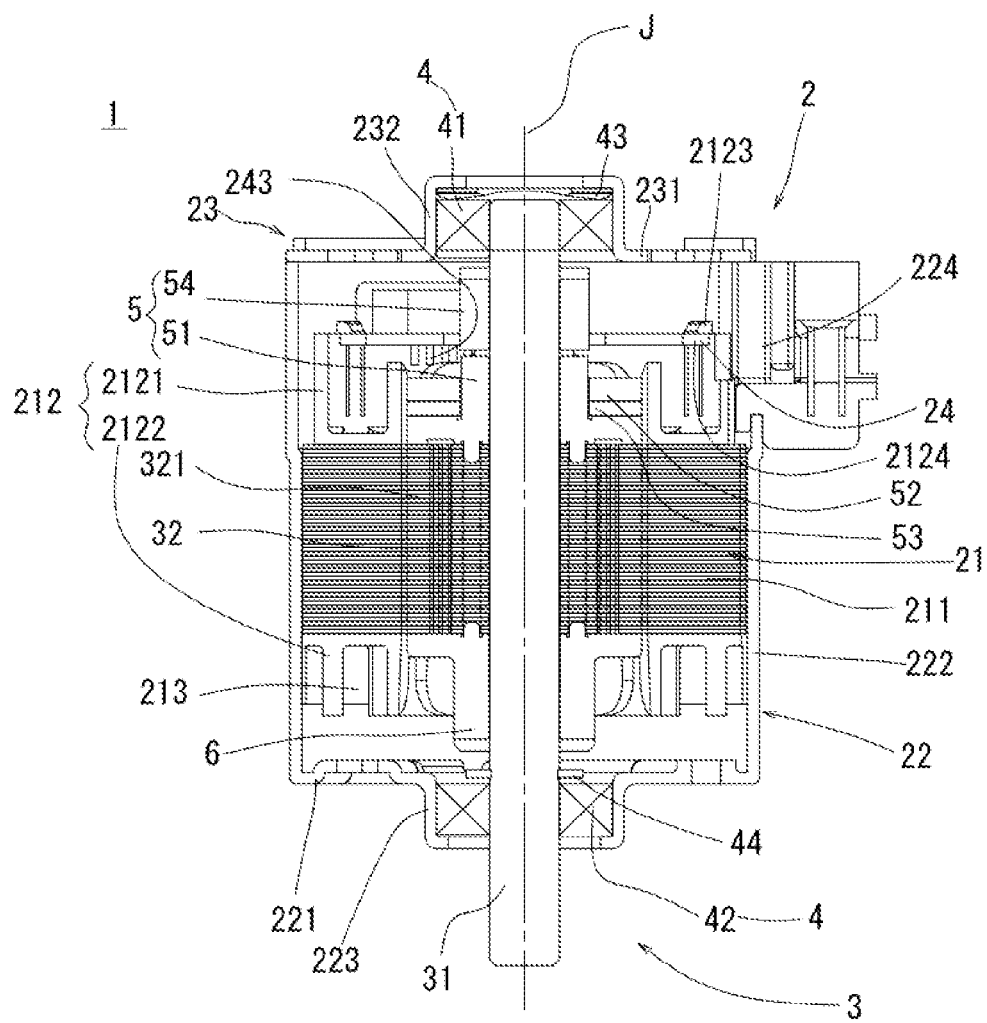
FIG. 1 is a vertical cross-sectional view of a motor according to a preferred embodiment of the present invention.

FIG. 1 is a vertical cross-sectional view of a motor 1 according to a preferred embodiment of the present invention. Referring to FIG. 1, the motor 1 includes a stator portion 2, a rotor portion 3, and a bearing portion 4. The stator portion 2 is fixed to a body of an apparatus in which the motor 1 is installed, such as, for example, a cooking appliance, a household electrical appliance, etc. The rotor portion 3 is supported through the bearing portion 4 to be rotatable with respect to the stator portion 2.

The stator portion 2 preferably includes a stator 21, a housing 22, a cap 23, and a circuit board 24. The stator 21 preferably includes a stator core 211, an insulator 212, and coils 213.

The stator core 211 is a portion that defines and functions as the stator 21 together with the coils 213. The stator core 211 is located radially opposite to a rotor 32 with a gap intervening therebetween. The rotor 32 is located radially inside of the stator 21. The stator core 211 is preferably defined by laminated steel sheets, that is, electromagnetic steel sheets, such as silicon steel sheets, placed one upon another in the axial direction. The stator core 211 includes an annular core back and a plurality of magnetic pole teeth projecting radially inward from the core back. The core back is preferably held with an outer circumferential surface of the core back being, for example, press fitted to an inner circumferential surface of the housing 22. Each coil 213 is wound around a separate one of the magnetic pole teeth of the stator core 211. According to the present preferred embodiment, the number of magnetic pole teeth is preferably six, for example.

Each coil 213 is preferably configured by a conducting wire wound around a separate one of the magnetic pole teeth, for example. Each coil 213 is wound around a corresponding one of the magnetic pole teeth with the insulator 212, which covers at least a portion of the stator core 211, intervening therebetween. According to the present preferred embodiment, four end portions of the conducting wires corresponding to a U phase, a V phase, a W phase, and a common portion are drawn out of the coils 213. Each of the end portions are preferably drawn out and connected to an external connector 224 arranged outside of a housing cylindrical portion 222 through a first cut portion 2221 defined in the housing cylindrical portion 222. This eliminates a need to solder a lead wire, and makes it easier to connect the lead wire to an outside.

An electric current to drive the motor 1 is supplied from an external power supply outside the housing 22 to each of the end portions drawn out. Once the electric current passes through each coil 213, radial magnetic flux is generated around a corresponding one of the magnetic pole teeth, which are magnetic cores. Then, interaction between the magnetic flux of the magnetic pole teeth and magnetic flux of a plurality of rotor magnets 322 of the rotor portion 3 produces a circumferential torque, so that the rotor portion 3 is caused to rotate about a central axis with respect to the stator portion 2.

The insulator 212 preferably includes an upper insulator 2121 located axially above and a lower insulator 2122 located axially below. Each of the upper insulator 2121 and the lower insulator 2122 is preferably a member made of, for example, a resin and is configured to provide electrical isolation between the stator core 211 and the coils 213. The upper insulator 2121 is located above the stator core 211. The lower insulator 2122 is located below the stator core 211. In other words, the stator core 211 is held between the upper insulator 2121 and the lower insulator 2122. The upper insulator 2121 covers an upper surface of each of the magnetic pole teeth. The lower insulator 2122 covers a lower surface of each of the magnetic pole teeth. In addition, both the upper insulator 2121 and the lower insulator 2122 cover a side surface of each of the magnetic pole teeth. The upper insulator 2121 and the lower insulator 2122 together define the insulator 212. Note, however, that the insulator 212 may alternatively be defined by three or more members combined together, for example. According to the present preferred embodiment, the insulator 212 is preferably fixed to the stator core 211 as a result of each coil 213 being wound around a corresponding one of the magnetic pole teeth with both the upper insulator 2121 and the lower insulator 2122 intervening therebetween.

The upper insulator 2121 includes snap-fit portions 2123 and cuts 2124. Each of the snap-fit portions 2123 projects axially upward from an upper end surface of the upper insulator 2121, and includes an axial top portion projecting radially inward. The cuts 2124 extend axially downward on both circumferential sides of each snap-fit portion 2123. Each of the snap-fit portions 2123 of the upper insulator 2121 is preferably fitted to a separate one of a plurality of circuit board projection portions 241 of the circuit board 24, which will be described below, such that the circuit board 24 is held.

The housing 22 preferably includes a housing bottom portion 221, the housing cylindrical portion 222, and a housing bearing portion 223. The housing bottom portion 221 preferably is a flat or substantially flat disk-shaped portion located axially below the lower insulator 2122, and extending perpendicularly or substantially perpendicularly to the central axis. The housing cylindrical portion 222 is a cylindrical or substantially cylindrical portion extending axially upward from a radially outer circumference of the housing bottom portion 221. The housing bearing portion 223 is a cylindrical portion extending axially downward from a radially inner circumference of the housing bottom portion 221.

The housing cylindrical portion 222 is configured to hold the stator core 211 with a radially outer circumferential surface of the stator core 211 preferably being press fitted, for example, to a radially inner circumferential surface of the housing cylindrical portion 222. In addition, the housing cylindrical portion 222 preferably includes the first cut portion 2221, which is recessed axially downward from an axially upper end surface of the housing cylindrical portion 222, and a plurality of second cut portions 2222, each of which is recessed axially downward to a smaller extent than the first cut portion 2221.

Figure 2:
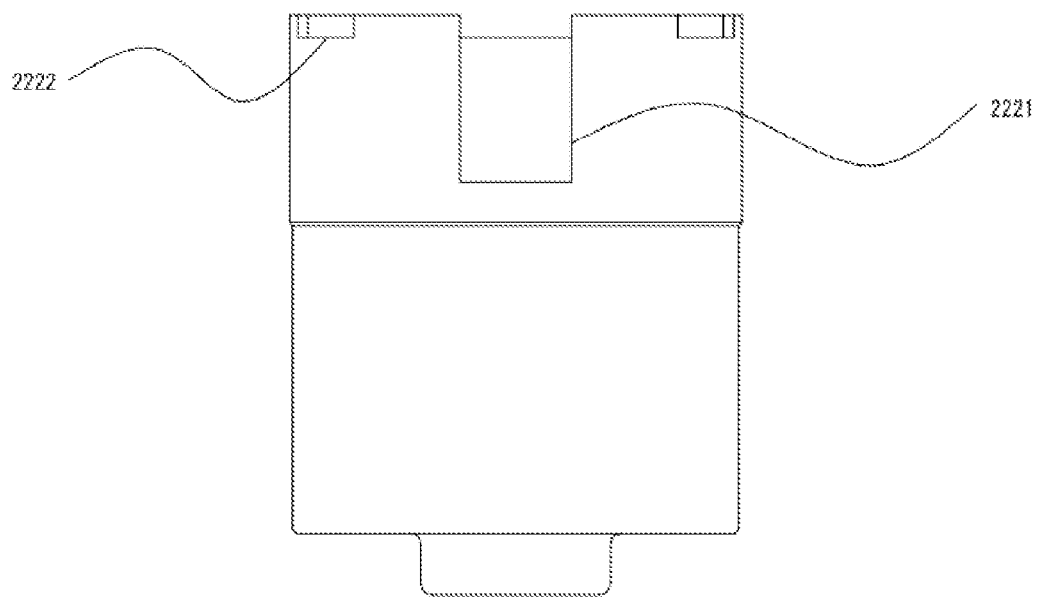
FIG. 2 is a side view of a housing according to a preferred embodiment of the present invention.

FIG. 2 is a side view of the housing 22 according to the present preferred embodiment. Referring to FIG. 2, the external connector 224, which will be described below, is fitted in the first cut portion 2221. A plurality of projections extending radially from the cap 23, which will be described below, are fitted in the second cut portions 2222, such that the cap 23 is held.

The housing bearing portion 223 is configured to hold a lower bearing 42, which will be described below, with an outer circumferential surface of the lower bearing 42 preferably being press fitted, for example, to a radially inner circumferential surface of the housing bearing portion 223.

Figure 3:
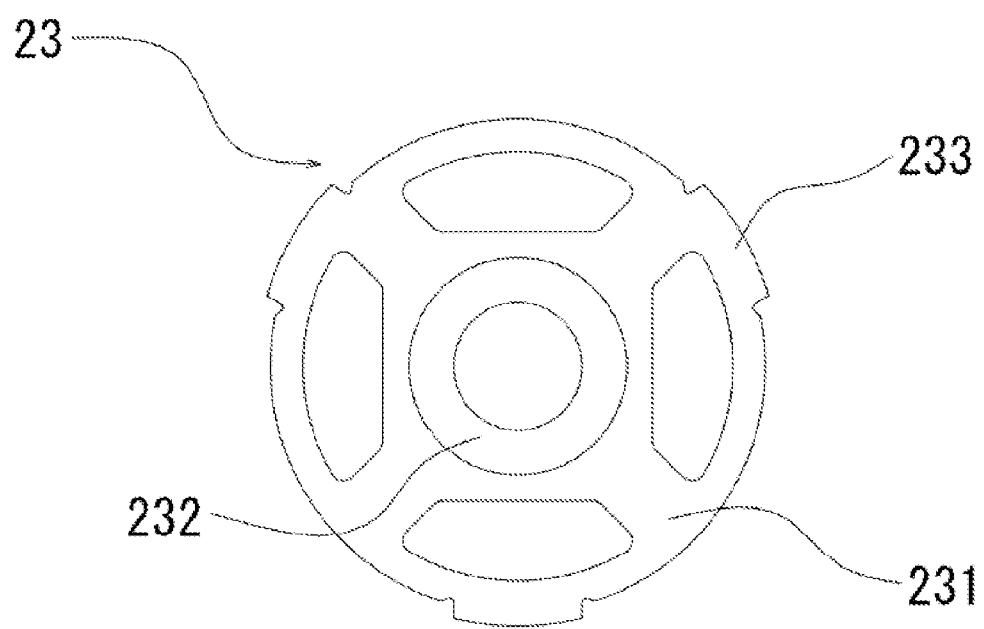
FIG. 3 is a plan view of a cap according to a preferred embodiment of the present invention.

FIG. 3 is a plan view of the cap 23 according to the present preferred embodiment. The cap 23 preferably includes a cap bottom portion 231 and a cap bearing portion 232.

The cap bottom portion 231 is a flat or substantially flat disk-shaped portion located axially above an upper balance correction portion 54, which will be described below, and extending perpendicularly or substantially perpendicularly to the axial direction. The cap bottom portion 231 includes a plurality of cap projection portions 233, each of which is projecting radially outward from a radially outer circumferential surface thereof. The cap projection portions 233 are fitted in the second cut portions 2222 of the housing cylindrical portion 222, and are thus fixed in a circumferential direction.

The cap bearing portion 232 is a cylindrical portion extending axially upward from a radially inner end of the cap bottom portion 231. The cap bearing portion 232 is configured to hold an upper bearing 41, which will be described below, with an outer circumferential surface of the upper bearing 41 preferably being, for example, press fitted to a radially inner circumferential surface of the cap bearing portion 232.

Figure 4:
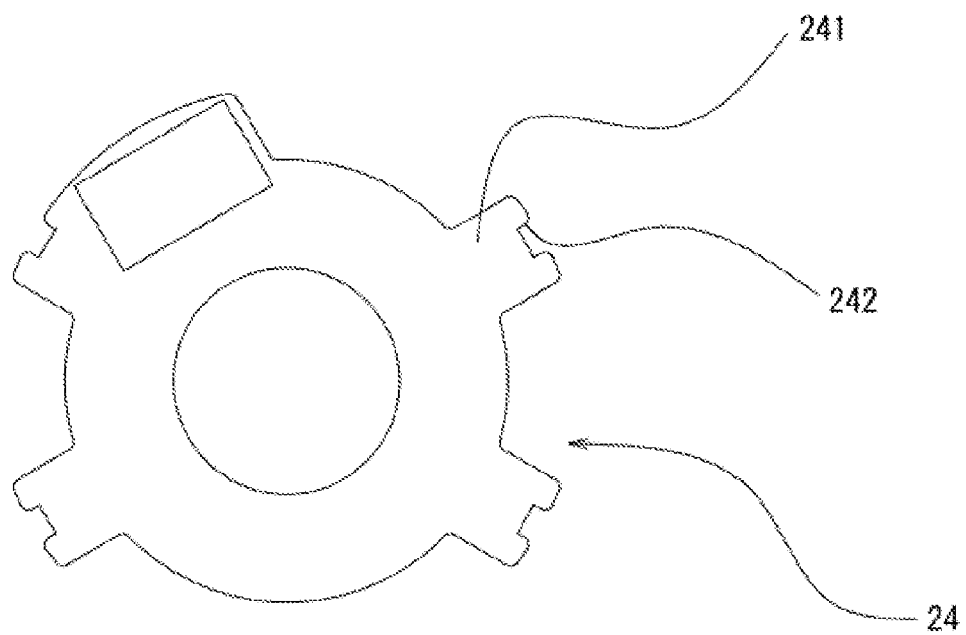
FIG. 4 is a plan view of a circuit board of the motor according to a preferred embodiment of the present invention.

The circuit board 24 is preferably a flat disk-shaped member located axially above the rotor 32, which will be described below, and extending perpendicularly or substantially perpendicularly to the axial direction. FIG. 4 is a plan view of the circuit board 24 of the motor 1 according to the present preferred embodiment. Referring to FIG. 4, the plurality of circuit board projection portions 241, each of which is projecting radially outward, are arranged at a radially outer circumferential surface of the circuit board 24.

Each of the circuit board projection portions 241 includes a circuit board cut portion 242 recessed radially inward in a radially outer circumferential surface thereof. The circuit board cut portion 242 of each circuit board projection portion 241 is fitted to a separate one of the snap-fit portions 2123 of the upper insulator 2121 described above, such that the circuit board 24 and the insulator 212 are fixed to each other.

A rotation detection portion 243 is preferably arranged on an axially lower surface of the circuit board 24.

An axially lower end of the rotation detection portion 243 is located opposite to an upper end of a sensor magnet 52, which will be described below, with a gap intervening therebetween. The rotation detection portion 243 is configured to detect the circumferential position of the sensor magnet 52 with high precision. According to the present preferred embodiment, the rotation detection portion 243 is preferably, for example, a Hall element.

Figure 5A:
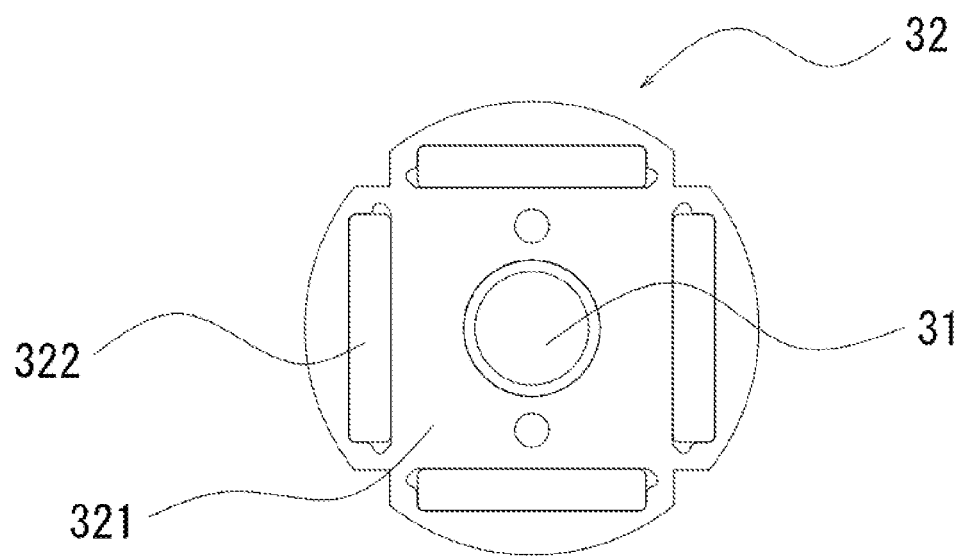
FIG. 5A is a plan view of a rotor according to a preferred embodiment of the present invention.

FIG. 5A is a plan view of the rotor 32 according to the present preferred embodiment. The rotor portion 3 preferably includes a shaft 31, the rotor 32, an upper cylindrical portion 5, and a lower cylindrical portion 6. The shaft 31 is a columnar or substantially columnar member extending in the vertical direction along the central axis. The shaft 31 is supported by the upper bearing 41 and the lower bearing 42 described above, and is configured to rotate about the central axis with respect to the stator portion 2.

The rotor 32 includes a rotor core 321 and the plurality of magnets 322.

The rotor core 321 is located radially opposite to the stator 21 with a gap intervening therebetween. The stator 21 is located radially outside of the rotor 32. The rotor core 321 is preferably defined by, for example, laminated steel sheets, that is, electromagnetic steel sheets, such as silicon steel sheets, placed one upon another in the axial direction. The rotor core 321 is a cylindrical or substantially cylindrical member including a plurality of holes each of which passes therethrough in the axial direction.

Figure 5B:
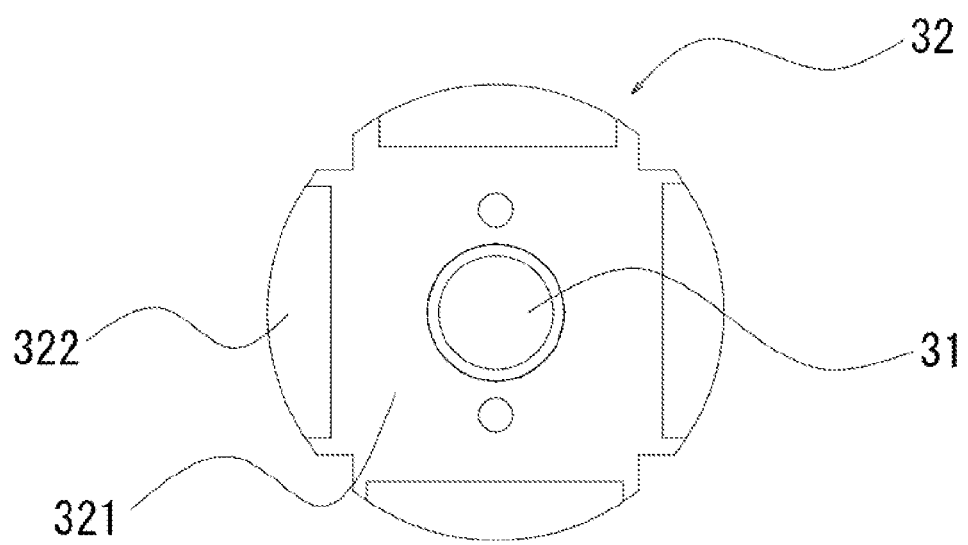
FIG. 5B is a plan view of a rotor according to another preferred embodiment of the present invention.

Each of the plurality of magnets 322 is preferably inserted into a separate one of the plurality of holes defined in the rotor core 321, and is thus fixed in both radial and circumferential directions. Note that the magnets 322 may alternatively be fixed to a radially outer circumference of the rotor core 321. FIG. 5B is a plan view of a rotor according to another preferred embodiment of the present invention. In FIG. 5B, a plurality of magnets 322 are fixed to a radially outer circumference of a rotor core 321.

The upper cylindrical portion 5 is located axially above the rotor core 321, and includes an upper cover portion 51, the sensor magnet 52, a sensor magnet yoke 53, and the upper balance correction portion 54.

Figure 6:
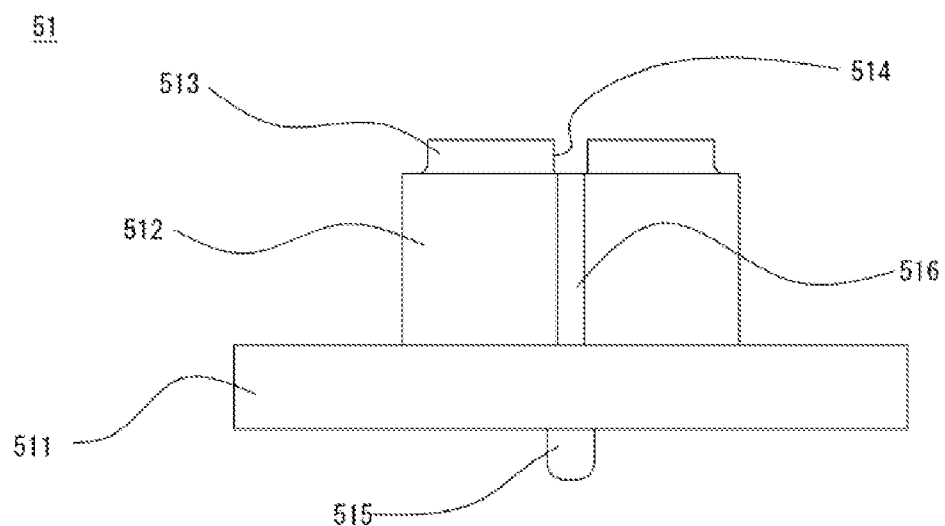
FIG. 6 is a side view of an upper cover portion (i.e., a portion of an upper cylindrical portion) according to a preferred embodiment of the present invention.

FIG. 6 is a side view of the upper cover portion 51 according to the present preferred embodiment. The upper cover portion 51 is preferably made of, for example, a resin. The upper cover portion 51 includes an upper first cylindrical portion 511, an upper second cylindrical portion 512, an upper third cylindrical portion 513, and a plurality of upper positioning portions 515. The upper cover portion 51 is preferably press fitted to the shaft 31, and is thus fixed.

The upper first cylindrical portion 511 is a cylindrical portion extending in the axial direction. A lower surface of the upper first cylindrical portion 511 is in contact with an upper surface of the rotor core 321.

The upper second cylindrical portion 512 is a cylindrical portion extending axially upward from a radially inner end of the upper first cylindrical portion 511. An outer circumferential surface of the upper second cylindrical portion 512 has a diameter smaller than that of an outer circumferential surface of the upper first cylindrical portion 511. The upper second cylindrical portion 512 includes, in the outer circumferential surface thereof, a projection 516 which projects radially outward and extends in the axial direction.

The upper third cylindrical portion 513 is a cylindrical portion extending axially upward from a radially inner end of the upper second cylindrical portion 512. An outer circumferential surface of the upper third cylindrical portion 513 preferably has a diameter smaller than that of the outer circumferential surface of the upper second cylindrical portion 512. The upper third cylindrical portion 513 includes, in the outer circumferential surface thereof, a cut 514 recessed radially inward and extending in the axial direction.

Each upper positioning portion 515 is a projecting portion projecting axially downward from a lower end of the upper first cylindrical portion 511. Each upper positioning portion 515 is inserted into one of the holes defined in the rotor core 321. The rotor 3 and the upper cover portion 51 are thus positioned relative to each other.

The upper first cylindrical portion 511 includes an annular upper surface. The sensor magnet yoke 53 is preferably located axially above the upper surface of the upper first cylindrical portion 511.

The sensor magnet yoke 53 is a cylindrical portion made of a magnetic material. An axially lower surface of the sensor magnet yoke 53 contacts the upper surface of the upper first cylindrical portion 511 of the upper cover portion 51 of the upper cylindrical portion 5. In addition, at least a portion of a radially inner circumferential surface of the sensor magnet yoke 53 contacts the outer circumferential surface of the second cylindrical portion 512 of the upper cylindrical portion 5. The inner circumferential surface of the sensor magnet yoke 53 preferably includes a cut recessed radially outward. This cut is fitted to the projection 516 extending in the axial direction and defined in the outer circumferential surface of the upper second cylindrical portion 512. The sensor magnet yoke 53 is thus fixed in the circumferential direction with respect to the upper second cylindrical portion 512. Note that, according to the present preferred embodiment, the upper cover portion 51 is a member on which a detectable portion is provided.

The sensor magnet 52 is a cylindrical portion. An axially lower surface of the sensor magnet 52 preferably contacts an upper surface of the sensor magnet yoke 53, and is fixed in the axial direction by a magnetic force generated between the sensor magnet 52 and the sensor magnet yoke 53. According to the present preferred embodiment, the sensor magnet 52 is the detectable portion. A radially inner circumferential surface of the sensor magnet 52 contacts the outer circumferential surface of the upper second cylindrical portion 512. The inner circumferential surface of the sensor magnet 52 includes a cut recessed radially outward. This cut is fitted to the projection 516 extending in the axial direction and defined in the outer circumferential surface of the upper second cylindrical portion 512. The sensor magnet 52 is thus fixed in the circumferential direction with respect to the upper second cylindrical portion 512.

Figure 7:
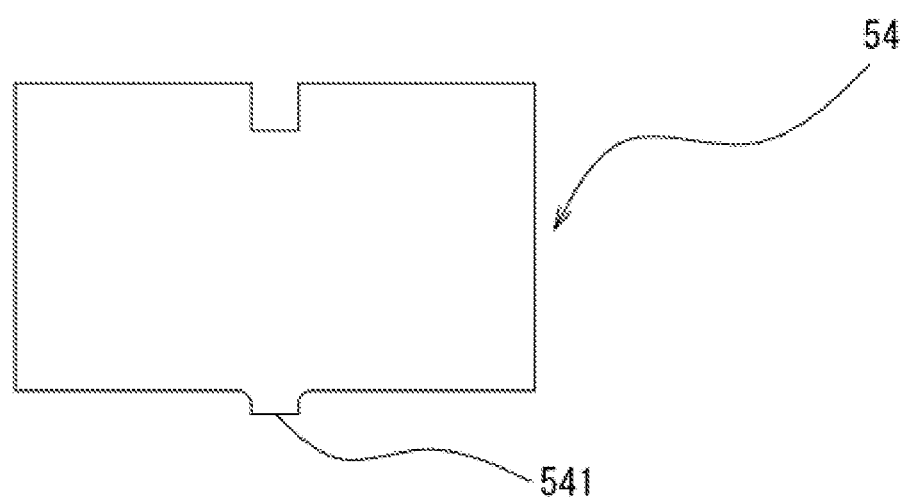
FIG. 7 is a side view of an upper balance correction portion (i.e., a portion of the upper cylindrical portion) according to a preferred embodiment of the present invention.

FIG. 7 is a side view of the upper balance correction portion 54 according to the present preferred embodiment. The upper balance correction portion 54 is preferably made of, for example, a resin. The upper balance correction portion 54 is a member separate from the member on which the detectable portion is arranged. This makes it possible to adjust the axial span between the upper balance correction portion 54 and a lower balance correction portion 64, and, in addition, improves operation efficiency in dynamic balance correction with the upper balance correction portion 54.

The upper balance correction portion 54 preferably includes a raised portion 541 projecting axially downward. The raised portion 541 projecting axially downward is fitted to the cut 514 defined in the upper third cylindrical portion 513 of the upper cover portion 51. The upper balance correction portion 54 is thus fixed in the circumferential direction. Note that the upper balance correction portion 54 may alternatively include a recessed portion which is cut in the axial direction. In this case, it is desirable that the upper balance correction portion 54 be fixed with the recessed portion being fitted to a raised portion defined in the upper third cylindrical portion 513 of the upper cover portion 51.

The upper balance correction portion 54 is a cylindrical portion located axially above the member on which the detectable portion is provided. This makes it possible to make the axial span between the upper balance correction portion 54 and the lower balance correction portion 64 long.

Here, it is possible to correct a dynamic balance of the rotor portion 3 by removing (e.g., by digging away) a portion of an outer portion of the upper balance correction portion 54. According to the present preferred embodiment, an electric drill or the like is preferably used to dig a hole in the resin at a radially outer portion of the upper balance correction portion 54 to perform dynamic balance correction of the rotor portion 3. Because the upper balance correction portion 54 is made of the resin, the dynamic balance correction is capable of being performed more easily than in a case where the upper balance correction portion 54 is made of, for example, a metal or the like.

The upper balance correction portion 54 is preferably a member separate from the upper cover portion 51. Thus, a portion of the resin can be removed by boring the upper balance correction portion 54 without significantly affecting the upper cover portion 51. Accordingly, no significant effect is produced on fixture of the sensor magnet 52 and the sensor magnet yoke 53 to the upper cover portion 51. Moreover, because the upper balance correction portion 54 to be bored is a member separate from the upper cover portion 51, the operation efficiency in the dynamic balance correction is improved. Note, however, that the upper balance correction portion 54 may alternatively be defined integrally with the upper cover portion 51 as a single monolithic member.

The upper balance correction portion 54 is located axially above the upper cover portion 51. Thus, the dynamic balance correction of the rotor portion 3 is capable of being performed at a position axially farther away from the rotor core 321 than in the case where the dynamic balance correction of the rotor portion 3 is performed with the upper cover portion 51.

The upper bearing 41, which will be described below, is located axially above the upper balance correction portion 54. An axially upper end of the upper balance correction portion 54 and an axially lower end of the upper bearing 41 are located axially opposite to each other with a gap intervening therebetween. Thus, when the balance correction is performed with the upper balance correction portion 54, the upper bearing is unlikely to be affected by digging away of a portion of the upper balance correction portion 54.

Figure 8:
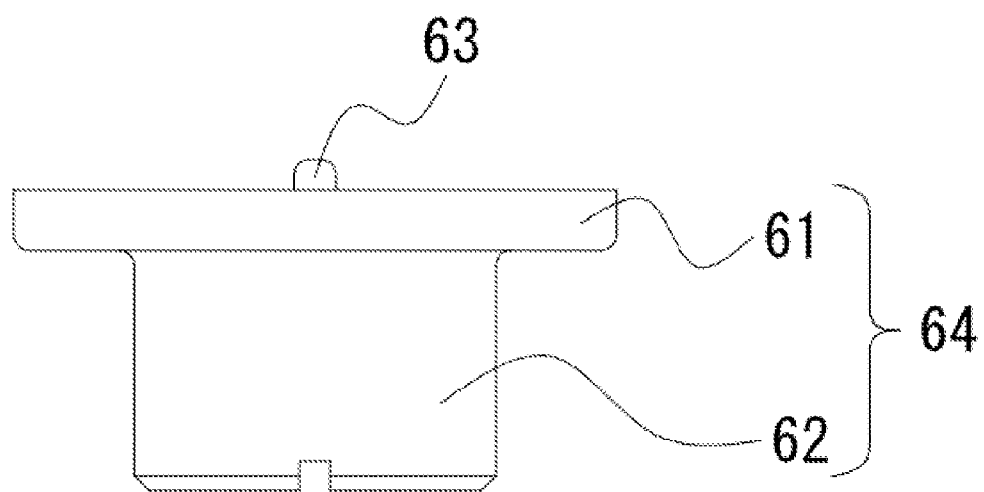
FIG. 8 is a side view of a lower cylindrical portion (including a lower balance correction portion) according to a preferred embodiment of the present invention.

FIG. 8 is a side view of the lower cylindrical portion according to the present preferred embodiment. The lower cylindrical portion 6 is located axially below the rotor core 321. The lower cylindrical portion 6 is preferably made of, for example, a resin. The lower cylindrical portion 6 preferably includes a lower first cylindrical portion 61, a lower second cylindrical portion 62, and a plurality of lower positioning portions 63. The lower cylindrical portion 6 includes the lower balance correction portion 64. The lower cylindrical portion 6 is press fitted to the shaft 31, and is thus fixed.

The lower first cylindrical portion 61 is a cylindrical portion extending in the axial direction. An upper surface of the lower first cylindrical portion 61 contacts a lower end of the rotor core 321.

The lower second cylindrical portion 62 is a cylindrical portion extending axially downward from a radially inner end of the lower first cylindrical portion 61. An outer circumferential surface of the lower second cylindrical portion preferably has a diameter smaller than that of an outer circumferential surface of the lower first cylindrical portion 61. The lower bearing 42, which will be described below, is located axially below the lower second cylindrical portion 62. A lower end of the lower second cylindrical portion 62 and an upper end of the lower bearing 42 are located axially opposite to each other with a gap intervening therebetween.

Here, it is possible to perform the dynamic balance correction of the rotor portion 3 by removing (e.g., by digging away) a portion of a side surface of the lower first cylindrical portion 61 or the lower second cylindrical portion 62. According to the present preferred embodiment, an electric drill or the like is preferably used to dig a hole in the resin at a radially outer circumferential surface of the lower second cylindrical portion 62 to perform the dynamic balance correction of the rotor portion 3. Because the lower cylindrical portion 6 is preferably made of, for example, resin, the dynamic balance correction is capable of being performed more easily than in the case where the lower cylindrical portion 6 is made of, for example, a metal or the like.

Moreover, because the lower end of the lower second cylindrical portion 62 and the upper end of the lower bearing 42 are located axially opposite to each other with the gap intervening therebetween, the likelihood that the lower bearing will be affected by the dynamic balance correction of the rotor portion 3 being performed with the lower cylindrical portion 6 is reduced.

According to the present preferred embodiment, the upper balance correction portion 54 is located axially below the upper bearing 41, while the lower balance correction portion 64 is located axially above the lower bearing 42. Thus, the axial span between the upper balance correction portion 54 and the lower balance correction portion 64 is shorter than a bearing span between the upper bearing 41 and the lower bearing 42. An excessively long axial span between the upper and lower balance correction portions 54 and 64 is thus avoided to improve precision in the dynamic balance correction.

In addition, according to the present preferred embodiment, a portion of the upper balance correction portion 54 made of the resin and a portion of the lower balance correction portion 64 made of the resin are dug away to correct the dynamic balance of the rotor portion 3. As a result, after the dynamic balance of the rotor portion 3 is corrected, the upper balance correction portion 54 or the lower balance correction portion 64 is axially asymmetric with respect to the central axis. Note that, although the dynamic balance correction is performed by removing a portion of the upper balance correction portion and a portion of the lower balance correction portion (i.e., so-called negative balancing) according to the present preferred embodiment, this is not essential to the present invention. For example, the dynamic balance correction may alternatively be performed by defining a groove in each of the upper balance correction portion and the lower balance correction portion and arranging a weight inside the groove (i.e., so-called positive balancing). Note, however, that the balance correction can be more easily performed by the so-called negative balancing.

Each lower positioning portion 63 is a raised portion projecting axially upward from an upper end of the lower first cylindrical portion 61. Each lower positioning portion 63 is inserted into one of the holes defined in the rotor core 321. Thus, the rotor 3 and the lower cylindrical portion 6 are positioned relative to each other.

Note that, although the lower cylindrical portion 6 is preferably defined by a single monolithic member according to the present preferred embodiment, this is not essential to the present invention. Just as the upper cylindrical portion 5 includes the upper cover portion 51 and the upper balance correction portion 54 separate from each other, the lower cylindrical portion 6 may alternatively be defined by two or more members.

The bearing portion 4 preferably includes the upper bearing 41 and the lower bearing 42.

The upper bearing 41 is fixed axially above the upper balance correction portion 54 with an inner race of the upper bearing 41 being press fitted to an outer circumferential surface of the shaft 31. An outer race of the upper bearing 41 is held by an inner circumferential surface of the cap bearing portion 232. The upper bearing 41 is configured to support the shaft 31 such that the shaft 31 is rotatable with respect to the cap 23.

A wave washer 43 is preferably located above the upper bearing 41. The wave washer 43 is located axially between an upper surface of the upper bearing 41 and a cap cover portion.

A washer 44 is preferably located above the lower bearing 42. The lower bearing 42 is fixed axially below the lower cylindrical portion 6 with an inner race of the lower bearing 42 being press fitted to the outer circumferential surface of the shaft 31. An outer race of the lower bearing 42 is held by an inner circumferential surface of the housing bearing portion 223. The lower bearing 42 is axially held by a housing cover portion and the washer 44 axially below the lower cylindrical portion 6. The lower bearing 42 is configured to support the shaft 31 such that the shaft 31 is rotatable with respect to the housing 22.

Note that the detailed shape of the motor 1 may be different from the shape thereof as illustrated in the accompanying drawings of the present application. Also note that features of the above-described preferred embodiments and the modifications thereof may be combined appropriately as long as no conflict arises.

For example, although the detectable portion and the rotation detection portion used for detection include the sensor magnet and the Hall element, respectively, according to the above-described preferred embodiment, this is not essential to the present invention. For example, the detectable portion and the rotation detection portion may alternatively be a scale and a photo-sensor, respectively. That is, an optical detector may alternatively be used.

Preferred embodiments of the present invention are applicable to motors, household electrical appliances, and cooking appliances.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inner-rotor brushless motor comprising:
    a rotor portion including a shaft extending in a vertical direction along a central axis;
    a stator portion located radially outside of the rotor portion; and
    a bearing portion configured to support the rotor portion with respect to the stator portion; wherein
    the rotor portion includes:
        a rotor configured to rotate together with the shaft, and including at least one magnet; and
        an upper cylindrical portion and a lower cylindrical portion located axially above and below, respectively, the rotor, and configured to rotate together with the rotor;
    the stator portion includes:
        a stator located radially opposite to the rotor with a gap intervening therebetween;
        a housing configured to hold the stator;
        a cap located axially above the housing; and
        a circuit board held by one of the housing and the stator, and including a rotation detection portion located thereon;
    the bearing portion includes:
        an upper bearing configured to rotatably support the shaft and held by the cap axially above the stator; and
        a lower bearing configured to rotatably support the shaft and held by the housing axially below the stator;
    the lower cylindrical portion includes a lower balance correction portion;
    the upper cylindrical portion includes a detectable portion configured to be detected by the rotation detection portion located thereon, and includes an upper balance correction portion; and
    the upper cylindrical portion includes a member on which the detectable portion is provided, the member being separate from the upper balance correction portion.

2. The brushless motor according to claim 1, wherein the upper balance correction portion is located axially above the member on which the detectable portion is provided.

3. The brushless motor according to claim 2, wherein the upper balance correction portion is located axially opposite to the upper bearing with a gap intervening therebetween.

4. The brushless motor according to claim 3, wherein the upper balance correction portion includes one of a raised portion projecting in an axial direction and a recessed portion which is cut in the axial direction.

5. The brushless motor according to claim 1, wherein the lower balance correction portion is located axially opposite to the lower bearing with a gap intervening therebetween.

6. The brushless motor according to claim 5, wherein
the upper balance correction portion is located axially below the upper bearing; and
the lower balance correction portion is located axially above the lower bearing.

7. The brushless motor according to claim 4, wherein
the rotor further includes a rotor core;
the rotor core includes a plurality of holes arranged to pass therethrough in the axial direction; and
each of the at least one magnet is inserted in one of the holes.

8. The brushless motor according to claim 4, wherein
the rotor further includes a rotor core; and
each of the at least one magnet is arranged on a radially outer circumference of the rotor core.

9. The brushless motor according to claim 6, wherein
the rotor further includes a rotor core;
the rotor core includes a plurality of holes arranged to pass therethrough in the axial direction; and
each of the at least one magnet is inserted in one of the plurality of holes.

10. The brushless motor according to claim 6, wherein
the rotor further includes a rotor core; and
each of the at least one magnet is located on a radially outer circumference of the rotor core.

11. The brushless motor according to claim 4, wherein the upper balance correction portion is axially asymmetric with respect to the central axis.

12. The brushless motor according to claim 6, wherein the lower balance correction portion is axially asymmetric with respect to the central axis.

13. The brushless motor according to claim 1, wherein
the stator includes an upper insulator arranged to cover a portion of the stator;
the circuit board includes, at a radially outer circumference thereof, a plurality of circuit board projection portions each of which is projecting radially outward;
the upper insulator includes at least one snap-fit portion projecting axially upward; and
each of the at least one snap-fit portion is fitted to one of the plurality of circuit board projection portions to fix the circuit board.

14. The brushless motor according to claim 13, wherein
the stator includes a conducting wire;
the housing includes a housing cylindrical portion including a cut defined therein; and
the conducting wire is connected to an external connector arranged outside of the housing cylindrical portion through the cut.

15. An electrical appliance comprising the brushless motor of claim 1.

* * * * *